United States Patent
Lemmerer et al.

(10) Patent No.: US 12,187,290 B2
(45) Date of Patent: Jan. 7, 2025

(54) METHOD AND CONTROL DEVICE FOR CONTROLLING A VEHICLE

(71) Applicant: AVL List GmbH, Graz (AT)

(72) Inventors: David Lemmerer, Weiz (AT); Hans Peter Gigerl, Gutenberg-Stenzengreith (AT); Johannes Jany-Luig, Graz (AT)

(73) Assignee: AVL List GmbH, Graz (AT)

( * ) Notice: Subject to any disclaimer, the term of this patent is extended or adjusted under 35 U.S.C. 154(b) by 485 days.

(21) Appl. No.: 17/618,546

(22) PCT Filed: Jun. 10, 2020

(86) PCT No.: PCT/AT2020/060238
§ 371 (c)(1),
(2) Date: Dec. 13, 2021

(87) PCT Pub. No.: WO2020/247997
PCT Pub. Date: Dec. 17, 2020

(65) Prior Publication Data
US 2022/0355803 A1   Nov. 10, 2022

(30) Foreign Application Priority Data
Jun. 13, 2019   (AT) .............................. A 50531/2019

(51) Int. Cl.
B60W 40/09 (2012.01)
B60W 30/18 (2012.01)
B60W 50/10 (2012.01)

(52) U.S. Cl.
CPC ...... *B60W 40/09* (2013.01); *B60W 30/18109* (2013.01); *B60W 50/10* (2013.01); *B60W 2510/18* (2013.01); *B60W 2540/30* (2013.01)

(58) Field of Classification Search
None
See application file for complete search history.

(56) References Cited

U.S. PATENT DOCUMENTS

| 5,430,645 | A | 7/1995 | Keller |
| 2007/0043496 | A1 | 2/2007 | Ogawa |

(Continued)

FOREIGN PATENT DOCUMENTS

| AT | 507938 | 9/2010 |
| AT | 520179 | 2/2019 |

(Continued)

OTHER PUBLICATIONS

Beschluss zur Erteilung eines Patentes [Decision to Grant A Patent] Dated May 15, 2020 From the Österreichisches Patentamt, Abteilung Erfindungen [Austrian Patent Office, Department of Invention] Re. Application No. A 50531/2019. (2 Pages).

(Continued)

*Primary Examiner* — Justin S Lee (57) ABSTRACT

The present invention relates to a method for operating a driver model for controlling a vehicle. According to the invention, a vehicle status of the vehicle is selected and activated by the driver model from a number of vehicle statuses (301, 303, 305, 307, 309) by comparing a current status of the vehicle with at least one selection condition specified for a particular vehicle status, the number of vehicle statuses (301, 303, 305, 307, 309) comprising at least a first vehicle status (301, 303, 305, 307, 309) and a second vehicle status (301, 303, 305, 307, 309). Furthermore, the driver model, on activation of a particular vehicle status (301, 303, 305, 307, 309), enables at least one control command assigned to the vehicle status (301, 303, 305, 307, 309) for modifying a setting of the vehicle, wherein a plurality of changes are made by the driver model between a currently activated vehicle status (301, 303, 305, 307, 309) and at least one further vehicle status (301, 303, 305, 307, 309) and, for at least one change of the plurality of changes, a coasting status (303), in which the vehicle is coasting, is (Continued)

activated before any activation of the further vehicle status (301, 303, 305, 307, 309) by the driver model.

15 Claims, 4 Drawing Sheets

(56) References Cited

U.S. PATENT DOCUMENTS

| | | | | |
|---|---|---|---|---|
| 2013/0116089 A1* | 5/2013 | Wegner | ............ | B60W 10/02 477/110 |
| 2019/0315337 A1* | 10/2019 | Weidenbach | ....... | B60W 20/30 |
| 2019/0367032 A1* | 12/2019 | Ito | ............ | B60W 50/00 |

FOREIGN PATENT DOCUMENTS

| | | |
|---|---|---|
| CN | 1920343 | 2/2007 |
| CN | 109803866 | 5/2019 |
| DE | 4103579 | 10/1991 |
| DE | 102006038004 | 3/2007 |
| DE | 102008043979 | 5/2010 |
| DE | 102015202397 | 8/2015 |
| JP | 2015-125004 | 7/2015 |
| JP | 2018-034600 | 3/2018 |
| WO | WO 2013/095237 | 6/2013 |
| WO | WO 2018/054914 | 3/2018 |

OTHER PUBLICATIONS

Internationaler Recherchenbericht und Schriftlicher Bescheid [International Search Report and the Written Opinion] Dated Oct. 7, 2020 From the International Searching Authority Re. Application No. PCT/AT2020/060238 and Its Translation of Search Report Into English. (13 Pages).

Notice of Reasons for Rejection Dated Jan. 9, 2024 From the Japan Patent Office Re. Application No. 2021-573784 and Its Translation Into English. (9 Pages).

* cited by examiner

METHOD AND CONTROL DEVICE FOR CONTROLLING A VEHICLE

RELATED APPLICATIONS

This application is a National Phase of PCT Patent Application No. PCT/AT2020/060238 having International filing date of Jun. 10, 2020, which claims the benefit of priority of Austrian Patent Application No. A 50531/2019 filed on Jun. 13, 2019. The contents of the above applications are all incorporated by reference as if fully set forth herein in their entirety.

The present invention relates to a method for operating a driver model for controlling a vehicle, a control device for controlling a vehicle, the use of the control device to carry out a test run for a vehicle and a computer program product.

In the prior art, in order to control a vehicle, for example to carry out a test run, driver models are used which adjust the respective pedals of the vehicle by means of control commands in such a way that a difference between a current vehicle speed and a required vehicle speed is minimal. The current vehicle speed is only changed using the pedals of the vehicle, which are operated alternately. Adjusting a vehicle speed in this way results in a suboptimal vehicle behaviour, in particular with regard to fuel consumption and pollutant emissions.

It is the object of the present invention to address, at least in part, the problems described above. In particular, it is the object of the present invention to provide a possibility for optimised operation of a vehicle, with regard to fuel consumption and pollutant emissions, using an automatic driver model to control the vehicle.

The above object is achieved through the claims. In particular, the above object is achieved through the respective subject matter of the independent claims. Further advantages of the invention arise from the dependent claims, the description and the drawings. Naturally, features and details which are described in connection with the method according to the invention also apply in connection with the control device according to the invention and vice versa, so that with regard to the disclosure, mutual reference is or can always be made to the individual aspects of the invention.

According to a first aspect of the present invention, a method for operating a driver model for controlling a vehicle is presented. A vehicle status of the vehicle is thereby selected and activated by the driver model from a number of vehicle statuses by comparing a current status of the vehicle with at least one selection condition specified for a particular vehicle, the number of vehicle statuses comprising at least a first vehicle status and a second vehicle status. Furthermore, the driver model, on activation of a particular vehicle status, enables at least one control command assigned to the vehicle status for modifying a setting of the vehicle, wherein a plurality of changes are made by the driver model between a currently activated vehicle status and at least one further vehicle status and, for at least one change of the plurality of changes, a coasting status, in which the vehicle is coasting, is activated before any activation of the further vehicle status by the driver model.

When using a driver model in terms of the present invention on a test bench and/or in a vehicle, the speed of the vehicle in particular is considered. Depending on the test cycle which is to be performed, a target speed is specified for this purpose which varies over time and thus can also be described as a target speed profile. In order to complete the test cycle, the speed of the vehicle is controlled by means of its accelerator pedal and its brake pedal. As in test operation, an operation of the accelerator pedal serves to increase the actual speed in a quantitative manner and an operation of the brake pedal results in a corresponding reduction in the actual speed in a quantitative manner. When carrying out such a speed control, the profile of the actual speed should follow the profile of the target speed as exactly as possible. In particular, deviation limits are specified, for example in the form of a lower limit line and an upper limit line, which represent a maximum deviation from the target speed which may not be exceeded. The profile of the target speed and the profile of the actual speed are therefore not congruent, but differ from one another. The difference between the two profiles varies in magnitude depending on the quality of the control function and/or of the driver model.

Within the context of the present disclosure, the term "coasting", applied to a vehicle, is to be understood to mean a driving status in which neither a driving power nor a braking power is demanded by the driver or a driver assistance system. The driver thus operates neither the accelerator pedal nor the brake pedal. In particular, it is not defined, through an operating status "coast" or a driver who allows a vehicle to coast, whether separating elements are released in order to reduce a drag torque in the drivetrain.

Within the context of the present disclosure, a "vehicle status" is to be understood to mean a specified setting of a vehicle.

Within the context of the present disclosure, an "enabling" of a control command is to be understood to mean a procedure wherein a control command is generated or a control instance made available, so that the control instance carries out a control procedure specified through the control command.

Within the context of the present disclosure, a change between different vehicle statuses is to be understood to mean a procedure wherein a current vehicle status is deactivated and a further vehicle status is activated.

The present method serves in particular to automatically carry out a test run for a vehicle on for example a test bench with optimal fuel efficiency and/or minimal pollutant emissions. For this purpose, according to the invention the vehicle is operated using a plurality of vehicle statuses.

Through the coasting status according to the invention, in which a respective vehicle coasts and is accordingly operated in a fuel-efficient and/or emissions-optimised manner, in addition to the conventionally-used actuators accelerator pedal and brake a further actuator is made available by means of which a vehicle speed of the vehicle can be adjusted. Accordingly, it is in particular the case that, when operating a vehicle using the method according to the invention, the vehicle is operated in the coasting status as often and/or as long as is possible taking into consideration a specified target power, for example a specified target speed.

The coasting status according to the invention enables a vehicle to be operated according to a specified target power requirement without using an accelerator pedal or a brake pedal and accordingly also without using drive energy or braking energy. For this purpose, the vehicle can for example be operated in the coasting status until a speed of the vehicle deviates from a specified target speed beyond a specified tolerance value, or will do so within a specified time window.

According to the invention, a plurality of changes are made by the driver model between a currently activated vehicle status and at least one further vehicle status and, for at least one change of the plurality of changes, a coasting status is activated before any activation of the further vehicle status by the driver model.

In order to change between particular vehicle statuses, a state machine can be used which determines a current status of a respective vehicle and compares this with a respective specified target power requirement and selects and activates or sets a particular vehicle status on the basis of the difference between the status of the vehicle and the target power requirement.

A state machine which can be used to change between different vehicle statuses can for example be designed as a control device, in particular as a central control device, or can be in communicative connection with a central control device of a vehicle in order to transmit to the central control device control commands assigned to a vehicle status which is to be activated. In particular, a finite state machine can be used to carry out the method according to the invention.

It can be the case that, with each change of the plurality of changes, or substantially with each change of the plurality of changes, in particular with the exception of a first change and of a last change of a respective journey of the vehicle, the coasting status is activated before any activation of the further vehicle status by the driver model.

For a more fuel-efficient and/or emissions-optimised operation of a vehicle, it has proved advantageous to activate the coasting status according to the invention as often as possible and/or for as long a duration as possible. Accordingly, an "intermediate shift" into the coasting status can always take place between a change from a first vehicle status to a further vehicle status, so that the first vehicle status is first deactivated, then the coasting status is activated, then, after for example a specified duration or on the vehicle reaching a specified driving status, the coasting status is deactivated and the further vehicle status is then activated.

In particular, no intermediate shift in the coasting status takes place with a first change and a last change of a respective journey of a respective vehicle. Since, as a rule, an initial vehicle status "stationary" or "start" is followed by a vehicle status "drive off", in which a direct or immediate provision of drive energy is necessary, in this driving situation a direct activation of the vehicle status "drive off" without prior activation of the coasting status is as a rule most fuel-efficient and/or lowest in emissions.

Furthermore, when bringing a vehicle to a stop in order to terminate a journey it is as a rule advantageous to brake the vehicle in order to reach a defined point in the road, so that a direct activation of a vehicle status "brake until stationary" without prior activation of the coasting status can be advantageous.

It can also be the case that the number of vehicle statuses according to the invention comprises at least two of the following vehicle statuses: "stationary", "drive off", "accelerate", "brake" and "brake until stationary", "coast", wherein on activation of the vehicle status "drive off" at least one brake of the vehicle is released and the vehicle is moved with a specified minimum position and/or a specified maximum position of the accelerator pedal.

On activation of the vehicle status "brake" it can be the case that a brake of the vehicle is activated and an accelerator pedal of the vehicle can only be moved as far as a specified maximum position.

On activation of the vehicle status "brake until stationary" it can be the case that the vehicle is brought to a halt according to a specified procedure which for example causes a fuel-optimised and/or emissions-minimised deceleration.

On activation of the vehicle status "accelerate" it can be the case that the vehicle is brought to a specified target speed according to a specified procedure which for example causes a fuel-optimised and/or emissions-minimised acceleration.

By specifying a minimum position of an accelerator pedal for the vehicle status "drive off", a vehicle can be set in motion rapidly, which may be more fuel-efficient than a slow acceleration.

By specifying a maximum position of an accelerator pedal for the vehicle status "drive off", unnecessary bursts of acceleration which may need to be corrected by means of a braking manoeuvre can be avoided.

It can also be the case that on activation of the coasting status by the driver model the following steps are carried out:
a) ascertaining a specified target power profile curve for the vehicle,
b) determining a tolerance band for the target power profile curve, wherein the tolerance band is limited by an upper limit line and a lower limit line, wherein the upper limit line is determined on the basis of a profile of the target power profile curve plus a specified upper tolerance value, and wherein the lower limit line is determined on the basis of the profile of the target power profile curve minus a specified lower tolerance value,
c) determining an expectation characteristic curve for a power of the vehicle to be expected in the future by extrapolating a power development of the vehicle at a current setting of the vehicle for a prediction window with a specified temporal length, wherein the conditions for activating the further vehicle status are that the expectation characteristic curve intersects at least one of the upper limit line and the lower limit line of the tolerance band within the temporal prediction window.

The use of a tolerance band and an expectation characteristic curve allows a future behaviour of a respective vehicle to be predicted or estimated and placed in relation to a specified target power requirement, so that for example as long as a respective expectation characteristic curve does not intersect a respective tolerance band, a vehicle can be operated in a particular vehicle status, for example the coasting status. Accordingly, the use of the tolerance band and the expectation characteristic curve allows a dynamic determination of a duration for which a respective vehicle status can remain activated.

It can also be the case that, in the event that the expectation characteristic curve intersects the upper limit line, a vehicle status is enabled in which a brake of the vehicle is activated, and in the event that the expectation characteristic curve intersects the lower limit line, a vehicle status is enabled in which a drive system of the vehicle is activated in order to accelerate.

It can also be the case that the following conditions must be fulfilled for activation of the vehicle status stationary: specified speed corresponds to "0" and current speed is less than a specified stationary threshold value and/or the following conditions must be fulfilled for activation of the vehicle status brake: current acceleration value corresponds to "0", activation of the brake of the vehicle is enabled and brake is released, and/or the following conditions must be fulfilled for activation of the vehicle status accelerate: activation of the drive system of the vehicle in order to accelerate is enabled, specified speed is greater than a specified crawling speed, and/or the following conditions must be fulfilled for activation of the vehicle status drive off: specified speed is greater than "0" or the brake is released.

It can further be the case that the following condition must be fulfilled for activating the vehicle status accelerate: current target speed is greater than a specified crawling speed.

It can further be the case that the following condition must be fulfilled for activating the vehicle status brake: current target speed is less than a specified crawling speed.

It can also be the case that an initialisation module determines a current status of a respective vehicle and assigns the determined status a particular vehicle status on the basis of the following conditions:

Condition 1: specified speed is equal to "0" and current speed is greater than a specified stationary threshold value, i.e. a threshold value of a speed which is classed as stationary.

Condition 2: current acceleration value is greater than "0" and specified speed is greater than a specified stationary threshold value.

Condition 3: brake activity is greater than "0" and specified speed is greater than a specified stationary threshold value.

The conditions 1 to 3 are for example thereby assigned to an initialisation module which serves to shift the vehicle into a status in which the driver model is activated. Since the vehicle can be in any status when the driver model is activated, on activation of the driver model the initialisation module determines which status is activated first. The conditions 1 to 3 represent the following driving statuses:

Condition 1: vehicle is supposed to be stationary, and is approximately stationary Condition 2: vehicle is supposed to drive and is too slow Condition 3: vehicle is supposed to drive or be stationary and is too fast It can also be the case that a control command assigned to a particular vehicle status enables a pedal controller of at least one pedal of a respective vehicle.

In order to achieve a change in the setting of a respective vehicle which corresponds to a respective vehicle status which is to be activated, a pedal controller can be used which controls at least one pedal of the vehicle. Accordingly, a control by the pedal controller which acts contrary to a vehicle status which is to be activated can be avoided in that the pedal controller is enabled by a control command specified through the vehicle status which is to be activated and is otherwise excluded from a control of the pedals.

It can also be the case that at least one control command assigned to a particular vehicle status enables a pedal controller of only one pedal of a respective vehicle.

By limiting an enabling of a control to only one pedal controller, an over-regulation whereby for example an accelerator pedal and a brake pedal are activated alternately with high frequency and a resulting less fuel-efficient and/or more pollutant-emitting operation of a corresponding vehicle can be avoided.

It can also be the case that an operation of the vehicle through use of the vehicle statuses can be activated or deactivated during running operation of the vehicle.

The present method can be activated or deactivated dynamically during running operation of a vehicle, i.e. during a journey. Accordingly, it can for example be the case that a vehicle is shifted into a driving status manually by a driver and then operated automatically by means of the driver model according to the invention using the vehicle statuses according to the invention.

It can also be the case that, on a change from the coasting status into a further vehicle status, a defined position of the accelerator pedal and/or of the brake pedal is taken as starting value.

A dynamic starting value, i.e. an adaptation of a zero position of a pedal on a change from the coasting status into a further vehicle status, allows a particularly smooth transition into an acceleration or braking phase, since "settling" into a current driving status starting out from an absolute zero position of a respective pedal is avoided.

It can also be the case that the method is carried out using a control cycle which specifies a minimum time interval for carrying out a change from one vehicle status into a further vehicle status, and wherein at least one control cycle lies between a change from one vehicle status into the coasting status and from the coasting status into a further vehicle status.

A control cycle can for example be a time interval between two control procedures and can last between several seconds and a few milliseconds, preferably between 2 seconds and 10 milliseconds, particularly preferably between 1 second and 50 milliseconds, in particular 100 milliseconds. Accordingly, by providing a control cycle between a change from the coasting status into a further vehicle status, a minimum duration is specified during which the coasting status remains activated, so that each activation of the coasting status results in a minimum saving in fuel consumption and/or reduction in emissions.

It can also be the case that in the event that a vehicle is in the vehicle status "stationary", a brake pedal of the vehicle is moved with a specified minimum value in order to activate a start/stop function.

Since a start/stop function has a considerable influence on the fuel-efficiency and/or pollutant emissions of a vehicle, an activation of such a function in a vehicle controlled using the present method is particularly advantageous.

According to a second aspect, the present invention relates to a control device for controlling a vehicle, wherein the control device comprises at least one computing unit. The at least one computing unit includes at least one driver module for activating a vehicle status of a vehicle from a number of vehicle statuses which is configured to compare a current status of the vehicle with at least one selection condition specified for a particular vehicle status, to select and activate a particular vehicle status depending on the comparison, wherein the number of vehicle statuses comprises at least a first vehicle status and a second vehicle status, wherein the driver module is further configured to carry out a plurality of changes between a currently activated vehicle status and a further vehicle status and, for at least one change of the plurality of changes, to activate a coasting status in which the vehicle is coasting before any activation of the further vehicle status by the driver module, and an enabling module which is configured, on activation of a particular vehicle status by the driver module, to enable at least one control command assigned to the vehicle status to change a setting of the vehicle.

Thus, the control device according to the invention brings the same advantages as have been explained in detail in relation to the method according to the invention.

According to a third aspect, the present invention relates to the use of the present control device to carry out a test run for a vehicle.

According to a fourth aspect, the present invention relates to a computer program product comprising program code means which configure a computer to carry out all steps according to the present method when the program code means are run on a computer.

The computer program product can be implemented as computer-readable instruction code in any appropriate programming language such as JAVA or C++. The computer program product may be stored on a computer-readable storage medium such as a data disk, a removable drive, a volatile or non-volatile storage means, or in a built-in storage means/processor. The instruction code can program a computer or other programmable device such as the control device in such a way that the desired functions are carried out. Furthermore, the computer program product may be provided in a network such as the Internet, from which it can be downloaded by a user as required. The computer program product can be realised both by means of a computer program, i.e. as software, as well as by means of one or more special electronic circuits, i.e. as hardware, or in any hybrid form, i.e. by means of software components and hardware components.

Further measures to improve the invention are explained in the following description of various exemplary embodiments of the invention, which are represented schematically in the figures. All features and/or advantages resulting from the claims, the description or the figures, including constructive details and spatial arrangements, may be essential to the invention both in themselves and in the various combinations.

In each case schematically.

Figure 1:
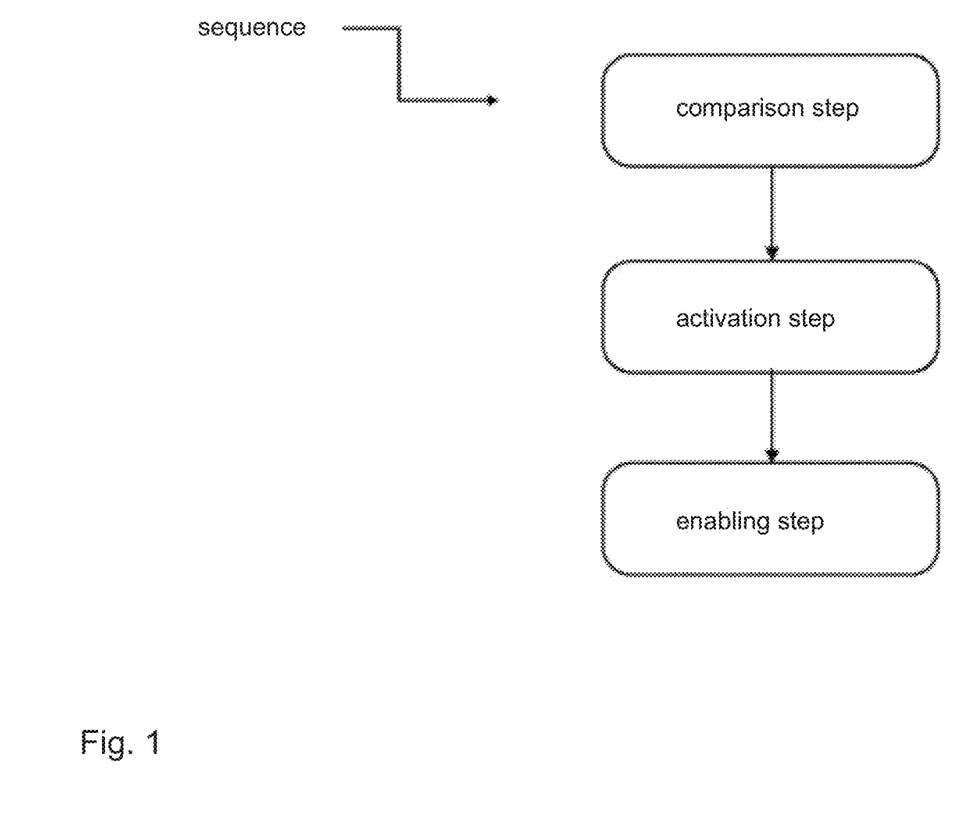
FIG. 1 shows a possible embodiment of the method according to the invention.

A sequence 100 of a possible embodiment of the present method is shown schematically in FIG. 1.

In a comparison step 101, a current status of a vehicle is determined by a driver model, i.e. for example a computer program for controlling a vehicle, in that driving data of the vehicle, collected for example by respective sensors, are loaded from a control device of the vehicle and evaluated. The current status of the vehicle is then compared by the driver model with at least one selection condition specified for a particular vehicle status. A selection condition can for example be a specified value for a measured value of a sensor of the vehicle and/or a specified target power requirement, for example a vehicle speed which is to be attained.

In the event that the current status of the vehicle corresponds with all selection conditions which are assigned to a particular vehicle status, the vehicle status is selected from a plurality of vehicle statuses and activated in an activation step 103.

It is proposed that in the event that a first vehicle status, for example a vehicle status "accelerate", has ended and a further vehicle status, for example a vehicle status "brake", is to be activated, a coasting status is activated after the vehicle status "accelerate" is deactivated and before the vehicle status "brake" is activated. Accordingly, the coasting status is "interposed". While the coasting status is activated, the vehicle is set in such a way that the vehicle coasts, i.e. it rolls without any drive power and without braking or deceleration.

In an enabling step 105, control commands assigned to a respective activated vehicle status are enabled and any corresponding controllers, for example actuators for moving respective pedals of the vehicle, are controlled by means of the control commands.

Figure 2:
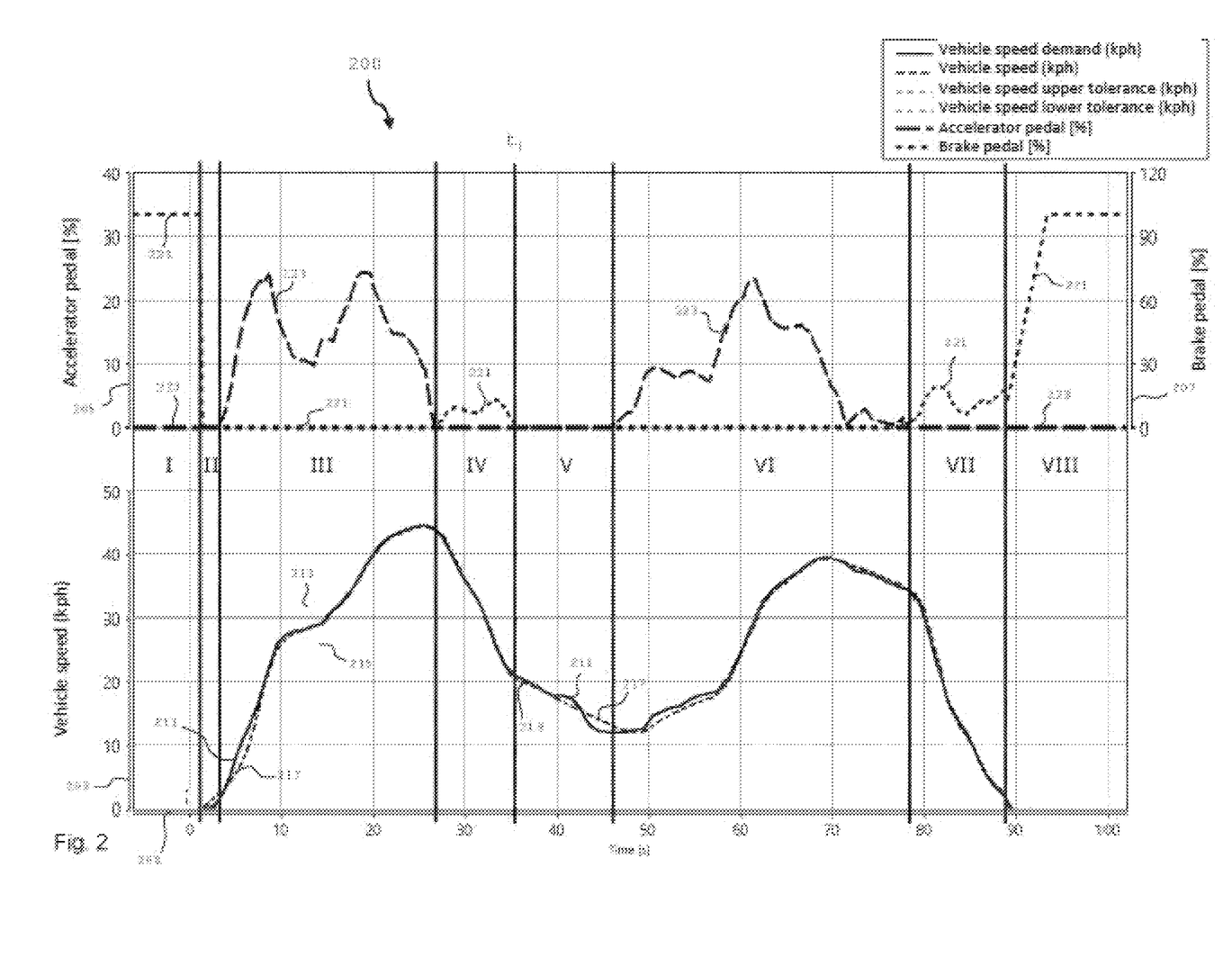
FIG. 2 shows a visualisation of a sequence for the control of a vehicle according to a possible embodiment of the method according to the invention.

FIG. 2 shows a diagram 200 in which the time in [seconds] is plotted on the abscissa 201 and a required vehicle speed in [km/h] and a measured vehicle speed in [km/h] are plotted on a first ordinate 203, an accelerator pedal position in [%] is plotted on a second ordinate 205 and a brake pedal position in [%] is plotted on a third ordinate 207. In particular, the diagram shows two different speed profiles. These are, on the one hand, the target power specification profile 211, shown as a solid line, which can also be described as the speed requirement for the vehicle and/or as the target speed. On the other hand, the diagram shows a vehicle speed profile 217, indicated with a dashed line, which differs from the target power specification profile 211 and can for example be described as the current speed or as the actual speed of the vehicle. The control of the vehicle attempts to keep the vehicle speed profile 217 as close as possible to the target power specification profile 211. The upper limit line 213 and the lower limit line 215, as control limits, are indicated here with dotted lines. The target power specification profile 211 of a target power requirement, shown as a solid line, can for example be specified through a test for determining pollutant emissions.

A brake pedal profile 221 shows, as a short-dashed line, a profile of a position of a brake pedal of the vehicle.

An accelerator pedal profile 223 shows, as a long-dashed line, a profile of a position of an accelerator pedal of the vehicle.

Also shown in FIG. 2 are driving statuses I to X, in each case separated by a dotted line, whereby the following applies:

I=stationary
II=start
III=accelerate
IV=brake
V=coast
VI=accelerate
VII=brake
VIII=stationary In status I, the brake pedal of the vehicle is operated in such a way that the vehicle does not move, as indicated by the brake pedal profile 221 in status I. This status corresponds to the stationary condition of the vehicle, which is secured against rolling away through the operation of the brake pedal. The accelerator pedal is not operated in this status I.

In status II, the brake pedal of the vehicle is released, as indicated by the brake pedal profile 221 during status II. The vehicle begins to crawl. The accelerator pedal has not yet been operated. This status II can be described as a crawl status and is for example known in automatic vehicles. The vehicle speed profile 217 shows this beginning of the movement of the vehicle through the rise. For the initial starting procedure, simply releasing the brake pedal is sufficient in order to follow the rise of the target power specification profile 211.

In status III, the brake pedal is completely released and the accelerator pedal of the vehicle is operated in order to accelerate the vehicle, as indicated by the accelerator pedal profile 223 in status III. The brake pedal is not operated and is in an idle position, as indicated by the brake pedal profile 221 in status III. In order also to follow the further increase in the speed according to the target power specification profile, the accelerator pedal is operated further as indicated by the accelerator pedal profile 223. The vehicle accelerates further, so that the vehicle speed profile 217 follows the target power specification profile 211 within the limit lines 213 and 215.

In status IV, according to the specification by the target power specification profile 211 the vehicle speed is to be reduced. For this purpose, the brake pedal of the vehicle is operated, as indicated by the brake pedal profile 221 in status IV, while the accelerator pedal was released beforehand, as indicated by the accelerator pedal profile 223 before status IV. As a result, the vehicle speed profile 217 follows the decreasing target power specification profile 211 in status IV.

In status V, neither the brake pedal nor the accelerator pedal of the vehicle are operated, as indicated by the accelerator pedal profile 223 extending along the abscissa 201 and brake pedal profile 221 extending along the abscissa 201 in status V. Accordingly, the vehicle coasts in status V. During the coasting status, the actual speed of the vehicle reduces according to the vehicle speed profile 217, which follows the likewise falling target power specification profile 211. The change in the speed is thus achieved without any pedal operation in status V, and in this way a real manual control situation by a real driver is emulated. For an efficient driver, no active braking is necessary for a moderate reduction in speed. A coasting status, in which a moderate braking effect is achieved through driving resistances of the vehicle, for example rolling friction on the wheels or air resistance of the vehicle, is sufficient here in order to follow the target power specification profile 211.

In status VI, the accelerator pedal of the vehicle is operated again in order to accelerate the vehicle, as indicated by the accelerator pedal profile 223 in status VI, while the brake pedal is not operated or is in an idle position, as indicated by the brake pedal profile 221 in status VI. In status VI, the varying force of operation of the accelerator pedal leads to an acceleration or also, due to the driving resistances, to a reduction in the actual speed of the vehicle according to the vehicle speed profile 217. As an acceleration status, this status VI thus corresponds substantially to status III.

In status VII, the brake pedal of the vehicle is operated, as indicated by the brake pedal profile 221 in status VII, while the accelerator pedal remains released, as indicated by the accelerator pedal profile 223 in status VII. This means that a braking status as in status IV is created here.

In status VIII, the brake pedal of the vehicle is operated more forcefully, as indicated by the brake pedal profile 221 in status VIII, while the accelerator pedal of the vehicle is not operated or is in an idle position, as indicated by the accelerator pedal profile 223 in status VIII extending along the abscissa. The vehicle is braked to a halt and is now secured in this stationary position by the depressed brake pedal. A change of the vehicle speed profile 217 no longer takes place here. At a current time t1 at the beginning of status V, an expectation characteristic curve 219, shown as a dashed line, is formed, starting out from a current vehicle speed at the time t1. The expectation characteristic curve 219 is extrapolated for a time window of for example 4 seconds, for example on the basis of speed values at the time t1 and optionally historical speeds starting out from the time t1, for example historical speeds within the range 0.2 seconds before time t1 up to time t1 or their slope function, and on the assumption that a behaviour of the vehicle remains constant. If, as is the case here, the expectation characteristic curve 219 intersects neither the upper limit line 213 nor the lower limit line 215, a vehicle status currently activated in the vehicle, in particular the coasting status, can remain activated. Accordingly, during status V the achieved vehicle speed profile 217 corresponds to the expectation characteristic curve 219 formed previously.

If the expectation characteristic curve 219 intersects the upper limit line 213, an excess speed of the vehicle in relation to the target power requirement is to be expected in the future, so that a vehicle status needs to be activated in which the vehicle is decelerated.

If the expectation characteristic curve 219 intersects the lower limit line 215, a deficit in the speed of the vehicle in relation to the target power requirement is to be expected in the future, so that a vehicle status needs to be activated in which the vehicle is accelerated.

Figure 3:
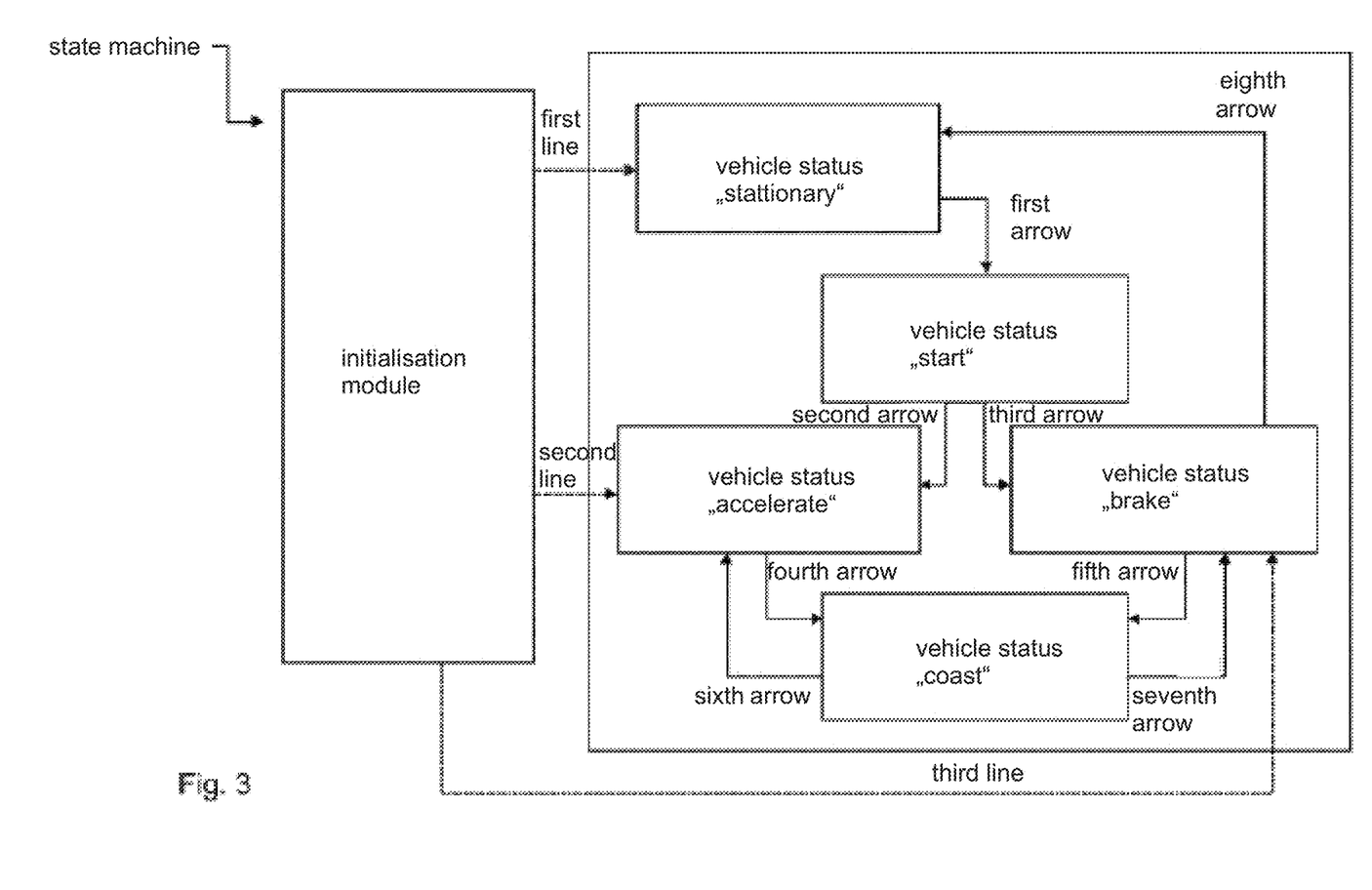
FIG. 3 shows a possible embodiment of the control device according to the invention.

FIG. 3 shows a state machine 300.

The state machine 300 comprises all vehicle statuses "accelerate" 301, "coast" 303, "brake" 305, "start" 307 and "stationary" 309 of a possible embodiment of the present method.

The state machine 300 further includes an initialisation module 311 which, on activation of the present method, evaluates a current status of a respective vehicle and assigns a vehicle status from the vehicle statuses "accelerate" 301, "coast" 303, "brake" 305, "start" 307 and "stationary" 309, as indicated by a first line 313, a second line 315 and a third line 317.

Starting out from a vehicle status activated by the initialisation module 311, depending on a status of the vehicle and respective target power requirements the vehicle statuses "accelerate" 301, "coast" 303, "brake" 305, "start" 307 and "stationary" 309 are activated, as indicated by a first arrow 319, a second arrow 321, a third arrow 323, a fourth arrow 325, a fifth arrow 327, a sixth arrow 329, a seventh arrow 331 and an eighth arrow 333. Preferably, a change from the vehicle status "accelerate" 301 to the vehicle status "brake" 305 and vice versa always takes place here via the vehicle status "coast" 303.

Figure 4:
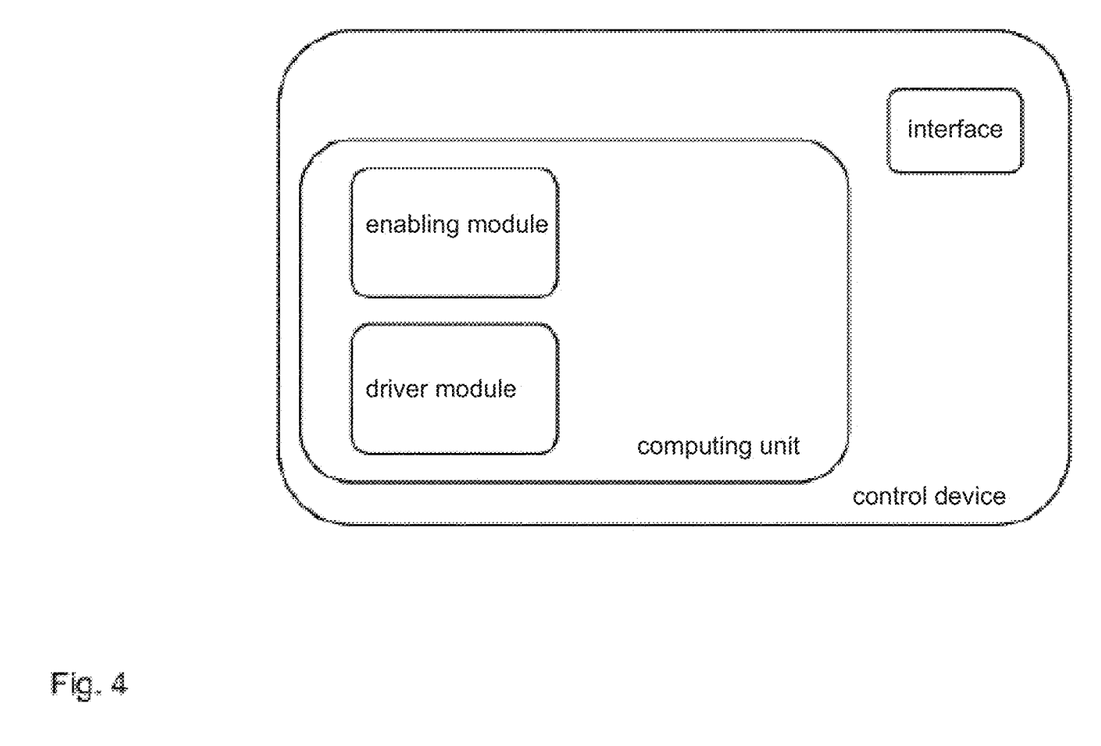
FIG. 4 shows a possible embodiment of a state machine for carrying out the method according to the invention.

FIG. 4 shows a control device 400. The control device 400 comprises a computing unit 401.

The computing unit includes a driver module 403 for activating a vehicle status of a vehicle from a number of vehicle statuses, which is configured to compare a current status of the vehicle with at least one selection condition specified for a particular vehicle status, to select and activate a particular vehicle status depending on the comparison, wherein the number of vehicle statuses comprises at least a first vehicle status and a second vehicle status.

The driver module 403 is further configured to carry out a plurality of changes between a currently activated vehicle status and a further vehicle status and, for at least one change of the plurality of changes, to activate a coasting status in which the vehicle is coasting before any activation of the further vehicle status by the driver module 403.

The computing unit 401 further includes an enabling module 405 which is configured, on activation of a particular vehicle status by the driver module, to enable at least one control command assigned to the vehicle status to change a setting of the vehicle.

The control device 400 further includes an interface 407 which can be designed as a wired or wireless interface and which is in communicative connection with a respective vehicle which is to be controlled in order to transmit control commands to the vehicle.

In addition to the illustrated embodiments, the invention allows for further design principles. That is to say, the invention should not be considered to be limited to the exemplary embodiments explained with reference to the figures.

LIST OF REFERENCE SIGNS 100 sequence
101 comparison step
103 activation step
105 enabling step
200 diagram
201 abscissa
203 first ordinate
205 second ordinate
207 third ordinate
211 target power specification profile
213 upper limit line
215 lower limit line
217 vehicle speed profile
219 expectation characteristic curve
221 brake pedal profile
223 accelerator pedal profile
300 state machine
301 vehicle status "accelerate"
303 vehicle status "coast"
305 vehicle status "brake"
307 vehicle status "start"
309 vehicle status "stationary"
311 initialisation module
313 first line
315 second line
317 third line
319 first arrow
321 second arrow
323 third arrow
325 fourth arrow
327 fifth arrow
329 sixth arrow
331 seventh arrow
333 eighth arrow
400 control device
401 computing unit
403 driver module
405 enabling module
407 interface

The invention claimed is:

1. A method for operating a driver model for controlling a vehicle,
wherein a vehicle status (301, 303, 305, 307, 309) of the vehicle is selected and activated by the driver model from a number of vehicle statuses (301, 303, 305, 307, 309) by comparing a current status of the vehicle with at least one selection condition specified for a particular vehicle status (301, 303, 305, 307, 309), wherein the number of vehicle statuses (301, 303, 305, 307, 309) comprises at least a first vehicle status (301, 303, 305, 307, 309) and a second vehicle status (301, 303, 305, 307, 309), and
wherein the driver model, on activation of a particular vehicle status (301, 303, 305, 307, 309), enables at least one control command assigned to the vehicle status (301, 303, 305, 307, 309) for modifying a setting of the vehicle, wherein a plurality of changes are made by the driver model between a currently activated vehicle status (301, 303, 305, 307, 309) and at least one further vehicle status (301, 303, 305, 307, 309) and, for at least one change of the plurality of changes, a coasting status (303), in which the vehicle is coasting, is activated before any activation of the further vehicle status (301, 303, 305, 307, 309) by the driver model,
wherein on activation of the coasting status (303) by the driver model the following steps are carried out:
a) ascertaining a specified target power profile curve (211) for the vehicle,
b) determining a tolerance band for the specified target power profile curve (211), wherein the tolerance band is limited by an upper limit line (213) and a lower limit line (215), wherein the upper limit line (213) is determined on a basis of a profile of the specified target power profile curve (211) plus a specified upper tolerance value, and wherein the lower limit line (215) is determined on the basis of the profile of the specified target power profile curve (211) minus a specified lower tolerance value,
c) determining an expectation characteristic curve (219) for a power of the vehicle to be expected in a future by extrapolating a power development of the vehicle at a current setting of the vehicle for a temporal prediction window with a specified temporal length, wherein
the conditions for activating the further vehicle status (301, 303, 305, 307, 309) are that the expectation characteristic curve (219) intersects at least one of the upper limit line (213) and the lower limit line (215) of the tolerance band within the temporal prediction window.

2. The method according to claim 1,
wherein with each change of the plurality of changes, or substantially with each change of the plurality of changes, in particular with the exception of a first change and of a last change of a respective journey of the vehicle, the coasting status (303) is activated before any activation of the further vehicle status (301, 303, 305, 307, 309) by the driver model.

3. The method according to claim 1,
wherein
the number of vehicle statuses (301, 303, 305, 307, 309) comprises at least two of the following vehicle statuses (301, 303, 305, 307, 309): "stationary" (309), "start" (307), "accelerate" (301) and "brake" (305), wherein, on activation of the vehicle status "start" (307), at least one brake of the vehicle is released and the vehicle is moved with a specified minimum position and/or a specified maximum position of an accelerator pedal.

4. The method according to claim 1,
wherein
in an event that the expectation characteristic curve (219) intersects the upper limit line (213), a vehicle status (301, 303, 305, 307, 309) is enabled in which a brake of the vehicle is activated, and in the event that the expectation characteristic curve (219) intersects the lower limit line (213), a vehicle status (301, 303, 305, 307, 309) is enabled in which a drive system of the vehicle is activated in order to accelerate.

5. The method according to claim 1,
wherein
the following conditions must be fulfilled for activation of the vehicle status stationary (309): specified speed corresponds to "0" and current speed is less than a specified stationary threshold value, and/or
the following conditions must be fulfilled for activation of a vehicle status brake (305): current acceleration value corresponds to "0", activation of the brake of the vehicle is enabled and brake is released, and/or the following conditions must be fulfilled for activation of a vehicle status accelerate (301): activation of the drive system of the vehicle to accelerate is enabled, specified speed is greater than a specified crawling speed, and/or the following conditions must be fulfilled for activation of a vehicle status start (307): specified speed is greater than "0" or the brake is released.

6. The method according to claim 1, wherein
the at least one control command assigned to a particular vehicle status enables a pedal controller of at least one pedal of the vehicle.

7. The method according to claim 1, wherein
the at least one control command assigned to a particular vehicle status enables a pedal controller of only one pedal of the vehicle.

8. The method according to claim 1, wherein
an operation of the vehicle through a use of the vehicle statuses (301, 303, 305, 307, 309) can be activated or deactivated during running operation of the vehicle.

9. The method according to claim 8, wherein
on a change from the coasting status (303) into a further vehicle status a defined position of an accelerator pedal and/or of a brake pedal is taken as a start value.

10. The method according to claim 1, wherein in an event that a vehicle is in the vehicle status "stationary" (309), a brake pedal of the vehicle is moved by a specified minimum value to activate a start/stop function.

11. A computer program product comprising program code means which configure a computer to carry out all steps of at least one method according to claim 1 when the program code means are run on the computer.

12. A control device (400) for controlling a vehicle,
wherein the control device comprises at least one computing unit (401), wherein the at least one computing unit comprises:
a driver module (403) for activating a vehicle status (301, 303, 305, 307, 309) of a vehicle from a number of vehicle statuses (301, 303, 305, 307, 309), which is configured to compare a current status of the vehicle with at least one selection condition specified for a particular vehicle status (301, 303, 305, 307, 309), to select and activate a particular vehicle status (301, 303, 305, 307, 309) depending on the comparison, wherein the number of vehicle statuses (301, 303, 305, 307, 309) comprises at least a first vehicle status (301, 303, 305, 307, 309) and a second vehicle status (301, 303, 305, 307, 309), wherein the driver module (403) is further configured to carry out a plurality of changes between a currently activated vehicle status (301, 303, 305, 307, 309) and a further vehicle status (301, 303, 305, 307, 309) and, for at least one change of the plurality of changes, to activate a coasting status (303) in which the vehicle is coasting before any activation of the further vehicle status (301, 303, 305, 307, 309) by the driver module (403),
an enabling module (405) which is configured, on activation of a particular vehicle status (301, 303, 305, 307, 309) by the driver module, to enable at least one control command assigned to the vehicle status (301, 303, 305, 307, 309) to change a setting of the vehicle, wherein
on activation of the coasting status (303) by the driver module (403) the following steps are carried out:

a) ascertaining a specified target power profile curve (211) for the vehicle,
b) determining a tolerance band for the specified target power profile curve (211), wherein the tolerance band is limited by an upper limit line (213) and a lower limit line (215), wherein the upper limit line (213) is determined on a basis of a profile of the specified target power profile curve (211) plus a specified upper tolerance value, and wherein the lower limit line (215) is determined on the basis of the profile of the specified target power profile curve (211) minus a specified lower tolerance value,
c) determining an expectation characteristic curve (219) for a power of the vehicle to be expected in a future by extrapolating a power development of the vehicle at a current setting of the vehicle for a temporal prediction window with a specified temporal length, wherein
the conditions for activating the further vehicle status (301, 303, 305, 307, 309) are that the expectation characteristic curve (219) intersects at least one of the upper limit line (213) and the lower limit line (215) of the tolerance band within the temporal prediction window.

13. A method to carry out a test run for a vehicle using a control device according to claim 12 to carry out a test run for a vehicle.

14. Method according to claim 1, A method for operating a driver model for controlling a vehicle,
wherein a vehicle status (301, 303, 305, 307, 309) of the vehicle is selected and activated by the driver model from a number of vehicle statuses (301, 303, 305, 307, 309) by comparing a current status of the vehicle with at least one selection condition specified for a particular vehicle status (301, 303, 305, 307, 309), wherein the number of vehicle statuses (301, 303, 305, 307, 309) comprises at least a first vehicle status (301, 303, 305, 307, 309) and a second vehicle status (301, 303, 305, 307, 309), and
wherein the driver model, on activation of a particular vehicle status (301, 303, 305, 307, 309), enables at least one control command assigned to the vehicle status (301, 303, 305, 307, 309) for modifying a setting of the vehicle, wherein a plurality of changes are made by the driver model between a currently activated vehicle status (301, 303, 305, 307, 309) and at least one further vehicle status (301, 303, 305, 307, 309) and, for at least one change of the plurality of changes, a coasting status (303), in which the vehicle is coasting, is activated before any activation of the further vehicle status (301, 303, 305, 307, 309) by the driver model,
wherein
the method is carried out using a control cycle which specifies a minimum time interval for carrying out a change from one vehicle status (301, 303, 305, 307, 309) into a further vehicle status (301, 303, 305, 307, 309), and wherein at least one control cycle lies between a change from one vehicle status (301, 303, 305, 307, 309) into the coasting status (303) and from the coasting status (303) into a further vehicle status (301, 303, 305, 307, 309).

15. A control device (400) for controlling a vehicle, comprising:
at least one computing unit (401), wherein the at least one computing unit comprises:
a driver module (403) for activating a vehicle status (301, 303, 305, 307, 309) of a vehicle from a number of vehicle statuses (301, 303, 305, 307, 309), which is configured to compare a current status of the vehicle with at least one selection condition specified for a particular vehicle status (301, 303, 305, 307, 309), to select and activate a particular vehicle status (301, 303, 305, 307, 309) depending on the comparison, wherein the number of vehicle statuses (301, 303, 305, 307, 309) comprises at least a first vehicle status (301, 303, 305, 307, 309) and a second vehicle status (301, 303, 305, 307, 309), wherein the driver module (403) is further configured to carry out a plurality of changes between a currently activated vehicle status (301, 303, 305, 307, 309) and a further vehicle status (301, 303, 305, 307, 309) and, for at least one change of the plurality of changes, to activate a coasting status (303) in which the vehicle is coasting before any activation of the further vehicle status (301, 303, 305, 307, 309) by the driver module (403), an enabling module (405) which is configured, on activation of a particular vehicle status (301, 303, 305, 307, 309) by the driver module, to enable at least one control command assigned to the vehicle status (301, 303, 305, 307, 309) to change a setting of the vehicle, wherein the driver module (403) is activated using a control cycle which specifies a minimum time interval for carrying out a change from one vehicle status (301, 303, 305, 307, 309) into a further vehicle status (301, 303, 305, 307, 309), and wherein at least one control cycle lies between a change from one vehicle status (301, 303, 305, 307, 309) into the coasting status (303) and from the coasting status (303) into a further vehicle status (301, 303, 305, 307, 309).

\* \* \* \* \*